United States Patent
Galtsev

(10) Patent No.: US 12,235,952 B2
(45) Date of Patent: Feb. 25, 2025

(54) METHOD AND SYSTEM FOR PRIORITIZING WEB-RESOURCES FOR MALICIOUS DATA ASSESSMENT

(71) Applicant: YANDEX EUROPE AG, Lucerne (CH)

(72) Inventor: Sergey Valerevich Galtsev, Balashikha (RU)

(73) Assignee: Y.E. Hub Armenia LLC, Yerevan (AM)

( * ) Notice: Subject to any disclaimer, the term of this patent is extended or adjusted under 35 U.S.C. 154(b) by 514 days.

(21) Appl. No.: 17/734,618

(22) Filed: May 2, 2022

(65) Prior Publication Data
US 2023/0026599 A1   Jan. 26, 2023

(30) Foreign Application Priority Data
Jul. 21, 2021   (RU) .................................. 2021121624

(51) Int. Cl.
*G06F 21/55* (2013.01)
*H04L 47/70* (2022.01)

(52) U.S. Cl.
CPC .............. *G06F 21/55* (2013.01); *H04L 47/82* (2013.01)

(58) Field of Classification Search
CPC ................................. G06F 21/55; H04L 47/82
See application file for complete search history.

(56) References Cited

U.S. PATENT DOCUMENTS 7,251,616 B1 *  7/2007  Perttunen ........... G06Q 30/0255
                                                    705/14.73
8,494,897 B1 *  7/2013  Dawson ................. G06Q 30/02
                                                    705/14.42

(Continued)

FOREIGN PATENT DOCUMENTS

CN         102571768 A      7/2012
CN         103544436 A      1/2014

(Continued)

OTHER PUBLICATIONS

Russian Search Report dated Oct. 24, 2023 issued in respect of the counterpart Russian Patent Application No. RU 2021121624.

(Continued)

*Primary Examiner* — J. Brant Murphy
(74) *Attorney, Agent, or Firm* — BCF LLP

(57) ABSTRACT

The disclosed systems and methods are for scheduling web-resources for a malicious data comprising receiving requests to publish web-resources, and generating a graph structure comprising: a parent nodes associated with parent web-resources, a zero-vertex node being connected with the of parent nodes via zero-vertex edges, child nodes associated with child web-resources, and web-resource edges connecting the parent nodes, child nodes and sub-child nodes. Using the graph structure, assigning, to a given child node a first assigned trust score based on a lowest trust score of a subset of parent nodes connected to the given child node in the graph structure such that a web-resource edge length connecting the given, child node and the subset of parent nodes is a representative of the first assigned trust score, applying a shortest-path algorithm for calculating a shortest-path and based on the shortest-path determining at least one web-resource prioritized for the malicious data assessment.

20 Claims, 12 Drawing Sheets

(56) References Cited

U.S. PATENT DOCUMENTS

| | | | | |
|---|---|---|---|---|
| 8,826,439 | B1* | 9/2014 | Hu | G06F 21/56 726/24 |
| 9,118,714 | B1* | 8/2015 | Thomson | G06T 11/206 |
| 9,195,826 | B1* | 11/2015 | Fang | G06F 21/56 |
| 10,291,645 | B1* | 5/2019 | Frantzen | G06F 21/554 |
| 10,440,042 | B1* | 10/2019 | Stein | G06N 20/00 |
| 10,681,063 | B1* | 6/2020 | Silva | G06F 21/577 |
| 2004/0064335 | A1* | 4/2004 | Yang | G06Q 30/0185 726/25 |
| 2005/0251805 | A1* | 11/2005 | Bamba | G06F 16/9558 718/100 |
| 2006/0095416 | A1* | 5/2006 | Barkhin | G06F 16/951 |
| 2007/0027666 | A1* | 2/2007 | Frankel | E21B 49/00 703/10 |
| 2010/0115621 | A1* | 5/2010 | Staniford | H04L 63/1416 726/25 |
| 2010/0186088 | A1* | 7/2010 | Banerjee | H04L 63/1433 709/224 |
| 2010/0251217 | A1* | 9/2010 | Miller | G06F 11/3664 717/126 |
| 2011/0083180 | A1* | 4/2011 | Mashevsky | G06F 21/554 726/25 |
| 2012/0010927 | A1* | 1/2012 | Attenberg | G06F 16/95 705/14.4 |
| 2012/0017281 | A1* | 1/2012 | Banerjee | G06F 21/577 726/25 |
| 2012/0102545 | A1* | 4/2012 | Carter, III | G06F 21/51 707/769 |
| 2013/0111591 | A1* | 5/2013 | Topan | H04L 63/14 726/24 |
| 2013/0179974 | A1* | 7/2013 | Manadhata | H04L 63/145 709/224 |
| 2015/0135324 | A1 | 5/2015 | Ben-Harrush et al. | |
| 2015/0200963 | A1 | 7/2015 | Geng et al. | |
| 2016/0134648 | A1* | 5/2016 | Falkowitz | H04L 63/0227 726/23 |
| 2017/0093863 | A1* | 3/2017 | Galtsev | H04L 63/20 |
| 2017/0374084 | A1* | 12/2017 | Inoue | H04L 63/1433 |
| 2018/0285466 | A1* | 10/2018 | Kovalev | H04L 67/535 |
| 2018/0343272 | A1* | 11/2018 | Khalil | G06F 21/56 |
| 2019/0222609 | A1* | 7/2019 | Slipenchuk | H04L 63/1416 |
| 2019/0364068 | A1* | 11/2019 | Reddy | G06F 16/24578 |
| 2021/0382949 | A1* | 12/2021 | Yastrebenetsky | G06F 21/577 |

FOREIGN PATENT DOCUMENTS

| | | |
|---|---|---|
| CN | 105187367 A | 12/2015 |
| CN | 107948168 A | 4/2018 |
| CN | 109919794 A | 6/2019 |
| RU | 2446459 C1 | 3/2012 |
| WO | 2017086992 A1 | 5/2017 |

OTHER PUBLICATIONS

Invernizzi et al., "Nazca: Detecting Malware Distribution in Large-Scale Networks", Published on Feb. 22, 2014, https://sites.cs.ucsb.edu/~vigna/publications/2014_NDSS_Nazca.pdf.

Sungjim "Anatomy on Malware Distribution Networks", Published on Apr. 6, 2020, https://ieeexplore.IEEE.org/document/9057639.

Hong et al., "Malicious Domain Names Detection Algorithm Based on N-Gram", Published on Feb. 3, 2019, https://www.hindawi.com/journals/jonc/2019/4612474/.

* cited by examiner

METHOD AND SYSTEM FOR PRIORITIZING WEB-RESOURCES FOR MALICIOUS DATA ASSESSMENT

TECHNICAL FIELD

The present technology generally relates to computer systems, and, in particular, to methods and systems for prioritizing web-resources for malicious data assessment.

BACKGROUND

In a computing environment, such as the internet, analyses of trustworthiness of a web-resource (e.g., a website, web document or the like) has become a cardinal task. However, with growth in internet utilization, there has been a significant increase in number of web-resources.

A given parent web-resource may contain hyperlinks to child web-resources, whereas the child web-resources in turn may contain hyperlinks to some other sub-child web-resources. Typically, the child web-resources, and sub-child web-resources may include ads, images, videos, other articles, and so on. In certain cases, the child web-resources, and sub-child web-resources are "third-party" and may contain malicious content, viruses, phishing content, undesirable content such as, pornography etc.

In this regard, the child web-resources, and sub-child web-resources must also be assessed and therefore prioritized. The child web-resources, and sub-child web-resources should be assessed at the same time (or close to it) with the associated parent web-resource.

However, due to large number of web-resources, this kind of assessment may strain the existing computational resources. To this end, there is an interest in developing systems and methods for efficient malicious data assessment among various web-resources with improved computational performance.

Generally, there exist several computer-based methods for identification of malicious web-resources. For example, "US 2010/0186088 A1" discloses a method and system for automated identification of phishing, phony, and malicious web sites are disclosed. According to one embodiment, a computer implemented method, comprises receiving a first input, the first input including a universal resource locator (URL) for a webpage. A second input is received, the second input including feedback information related to the webpage, the feedback information including an indication designating the webpage as safe or unsafe. A third input is received from a database, the third input including reputation information related to the webpage. Data is extracted from the webpage. A safety status is determined for the webpage, including whether the webpage is hazardous by using a threat score for the webpage and the second input, wherein calculating the threat score includes analyzing the extracted data from the webpage. The safety status for the webpage is reported.

"U.S. Pat. No. 10,291,645 B2" discloses a computer implemented method provides a technical solution to the technical problem of detecting and preventing malicious activity in a computer network, the technical solution involving calculating, based on hypergraph data, a maliciousness value indicating a likelihood of association of one or more nodes of the hypergraph with a known malicious actor, and programmatically performing, based on the calculated maliciousness value, one or more actions by a computer system designed to ensure security of the computer system.

SUMMARY

Embodiments of the present technology have been developed based on developers' appreciation of at least one technical problem associated with the prior art solutions.

Developers of the present technology have realized that an increase in (i) internet usage and (ii) number of online platforms has given an opportunity to multiple users to publish content online. With this increase, a risk of publishing content that may include malicious data may also increases. To this end, several prior art techniques have suggested to assess the content before publishing. However, in order to assess a large number of content, computationally expensive resources would be required.

Hence, it can be said that in at least some embodiments of the present technology, the developers of the present technology have devised methods and devices for prioritizing the content for malicious data assessment and thereby reducing the strain on computational resources.

In accordance with a first broad aspect of the present technology, there is provided a method for scheduling a plurality of web-resources for a malicious data assessment, the method executable by a processing server, the method comprising: receiving, by the processing server, a plurality of requests to publish the plurality of web-resources; generating, by the processing server, a graph structure comprising: a plurality of parent nodes associated with a plurality of parent web-resources, each of the plurality of parent nodes being assigned a respective trust score based on the association with the plurality of parent web-resources; a zero-vertex node being connected with the plurality of parent nodes via a plurality of zero-vertex edges such that, a zero-vertex edge length of each one of the plurality of zero-vertex edges representing the respective trust scores associated with the plurality of parent nodes; a plurality of child nodes associated with a plurality of child web-resources; a plurality of web-resource edges, a given web-resource edge of the plurality of web-resource edges connecting a given parent node of the plurality of parent nodes to a given child node of the plurality of child nodes such that, a given parent web-resource associated with the given parent node is linked to a given child web-resource associated with the given child node by virtue of a first hyperlink from the given parent web-resource to the given child web-resource; using the graph structure, assigning, by the processing server, to the given child node of the plurality of child nodes a first assigned trust score based on a lowest trust score of a subset of the plurality of parent nodes connected to the given child node in the graph structure such that, a web-resource edge length of each one of the plurality of web-resource edges connecting the given child node and the subset of the plurality of parent nodes is a representative of the first assigned trust score; applying, by the processing server, a shortest-path algorithm for calculating a shortest-path of all respective paths from the zero-vertex node to each child node, each one of the respective paths including a given zero-vertex edge and the given web-resource edge; and determining, by the processing server, based on the shortest-path, at least one web-resource of the plurality of web-resources such that, the at least one web-resource is prioritized for the malicious data assessment.

In some embodiments of the method, wherein the processing server is: coupled to a search log comprising one or more search engine result pages generated in response to previously executed search queries and associated user interactions; and wherein assigning the trust score to the given parent node comprises at least one of: generating a ranking feature associated with the given parent web-resource associated with the given parent node, the ranking feature being indicative of an average ranking of the given parent web-resource within the one or more search engine result pages; generating an interaction feature associated with the given parent web-resource associated with the given parent node, the interaction feature being indicative of user satisfaction with the given parent web-resource in response to interacting with the given parent web-resource within the one or more search engine result pages.

In some embodiments of the method, wherein the processing server has access to: a first list comprising a first set of web-resources labelled as being non-malicious web-resources; a second list comprising a second set of web-resources labelled as being malicious web-resources; wherein the assigning the respective trust score to each of the plurality of parent nodes comprises: assigning a first trust score to the given parent node if the given parent web-resource associated with the given parent node is included in the first list; assigning a second trust score to the given parent node if the given parent web-resource associated with the given parent node is included in the second list; assigning a third trust score to the given parent node if the given parent web-resource is not included within the first list or the second list.

In some embodiments of the method, wherein the method further comprises generating the first list and the second list based on searching, by the processing server, in a search log, wherein the search log is coupled to the processing server and comprises one or more searches previously executed and associated user activities.

In some embodiments of the method, wherein the first trust score is greater than the second trust score and the third trust score.

In some embodiments of the method, wherein the third trust score is greater than the second trust score.

In some embodiments of the method, wherein generating the graph structure further comprises: generating, by the processing server, a plurality of sub-child nodes associated with a plurality of sub-child web-resources, such that, a given sub-child node of the plurality of sub-child nodes is connected to the given child node via an associated web-resource edge; the given child web-resource associated with the given child node is linked to a given sub-child web-resource associated with the given sub-child node by virtue of a second hyperlink from the given child web-resource to the given sub-child web-resource; using the graph structure, assigning, by the processing server, to the given sub-child node of the plurality of sub-child nodes a second assigned trust score based on an overall lowest trust score of: i) the subset of the plurality of parent nodes and ii) a subset of the plurality of child nodes connected to the given sub-child node in the graph structure such that, the web-resource edge length of each one of the plurality of web-resource edges connecting the given sub-child node with the subset of the plurality of parent nodes and the subset of the plurality of child nodes is a representative of the second assigned trust score; applying, by the processing server, the shortest-path algorithm for calculating an overall shortest-path of all respective paths from the zero-vertex node to each sub-child node, each one of the respective paths including the given zero-vertex edge and the plurality of web-resource edges connecting the given parent node, the given child node, and the given sub-child node; and determining, by the processing server, based on the overall shortest-path, the at least one web-resource of the plurality of web-resources such that, the at least one web-resource is prioritized for the malicious data assessment.

In some embodiments of the method, wherein the plurality of web-resources comprises the plurality of parent web-resources, the plurality of child web-resources, and the plurality of sub-child web-resources.

In some embodiments of the method, wherein the method further comprises assessing, by the processing server, at least one of: at least one parent web-resource which is prioritized for malicious data assessment; at least one child web-resource which is prioritized for malicious data assessment; at least one sub-child web-resource which is prioritized for malicious data assessment.

In some embodiments of the method, wherein the method further comprises notifying, by the processing server, about the malicious data identified in one or more of: i) the at least one child web-resource, ii) the at least one sub-child web-resource, and iii) the at least one parent web-resource.

In some embodiments of the method, wherein the method further comprises altering the second assigned trust score and the web-resource edge length of each one of the plurality of web-resource edges connecting the given sub-child node with the subset of the plurality of parent nodes and the subset of the plurality of child nodes.

In some embodiments of the method, wherein altering the second assigned trust score includes one or more of: decreasing the second assigned trust score and the web-resource edge length of each one of the plurality of web-resource edges connecting the given sub-child node with the subset of the plurality of parent nodes and the subset of the plurality of child nodes is reduced accordingly; increasing the second assigned trust score and the web-resource edge length of each one of the plurality of web-resource edges connecting the given sub-child node with the subset of the plurality of parent nodes and the subset of the plurality of child nodes is increased accordingly.

In some embodiments of the method, wherein the shortest-path algorithm corresponds to at least one of: i) Dijkstra's algorithm; ii) Breadth-first search (BFS); iii) Mikkel Thorup's algorithm for undirected single-source shortest paths with positive integer weights in linear time; iv) Bellman-Ford algorithm.

In some embodiments of the method, wherein the plurality of requests to publish the plurality of web-resources are received from a plurality of client devices.

In some embodiments of the method further comprising rejecting a given request of the plurality of requests if the at least one web-resource of the plurality of web-resources associated the given request including malicious data.

In accordance with a second broad aspect of the present technology, there is provided a processing server for scheduling a plurality of web-resources for a malicious data assessment, the processing server is configured to: receive a plurality of requests to publish the plurality of web-resources; generate a graph structure, wherein the graph structure comprises: a plurality of parent nodes associated with a plurality of parent web-resources, each of the plurality of parent nodes being assigned a respective trust score based on the association with the plurality of parent web-resources; a zero-vertex node being connected with the plurality of parent nodes via a plurality of zero-vertex edges such that, a zero-vertex edge length of each one of the plurality of zero-vertex edges representing the respective trust scores associated with the plurality of parent nodes; a plurality of child nodes associated with a plurality of child web-resources; a plurality of web-resource edges, a given web-resource edge of the plurality of web-resource edges connecting a given parent node of the plurality of parent nodes to a given child node of the plurality of child nodes such that, a given parent web-resource associated with the given parent node is linked to a given child web-resource associated with the given child node by virtue of a first hyperlink from the given parent web-resource to the given child web-resource; assign, to the given child node of the plurality of child nodes, a first assigned trust score based on a lowest trust score of a subset of the plurality of parent nodes connected to the given child node in the graph structure such that, a web-resource edge length of each one of the plurality of web-resource edges connecting the given child node and the subset of the plurality of parent nodes is a representative of the first assigned trust score; apply a shortest-path algorithm for calculating a shortest-path of all respective paths from the zero-vertex node to each child node, each one of the respective paths including a given zero-vertex edge and the given web-resource edge; and determine, based on the shortest-path, at least one web-resource of the plurality of web-resources such that, the at least one web-resource is prioritized for the malicious data assessment.

In some embodiments of the processing server, wherein the processing server is: coupled to a search log comprising one or more search engine result pages generated in response to previously executed search queries and associated user interactions; and wherein the processing server is configured to assign the trust score to the given parent node by at least one of: generating a ranking feature associated with the given parent web-resource associated with the given parent node, the ranking feature being indicative of an average ranking of the given parent web-resource within the one or more search engine result pages; generating an interaction feature associated with the given parent web-resource associated with the given parent node, the interaction feature being indicative of user satisfaction with the given parent web-resource in response to interacting with the given parent web-resource within the one or more search engine result pages.

In some embodiments of the processing server, wherein the processing server has access to: a first list comprising a first set of web-resources labelled as being non-malicious web-resources; a second list comprising a second set of web-resources labelled as being malicious web-resources; and wherein the processing server is configured to assign the trust score to the given parent node by at least one of: assigning a first trust score to the given parent node if the given parent web-resource associated with the given parent node is included in the first list; assigning a second trust score to the given parent node if the given parent web-resource associated with the given parent node is included in the second list; assigning a third trust score to the given parent node if the given parent web-resource is not included within the first list or the second list.

In some embodiments of the processing server, wherein the processing server is further configured to: generate a plurality of sub-child nodes associated with a plurality of sub-child web-resources, such that, a given sub-child node of the plurality of sub-child nodes is connected to the given child node via an associated web-resource edge; the given child web-resource associated with the given child node is linked to a given sub-child web-resource associated with the given sub-child node by virtue of a second hyperlink from the given child web-resource to the given sub-child web-resource; assign, to the given sub-child node of the plurality of sub-child nodes a second assigned trust score based on an overall lowest trust score of: i) the subset of the plurality of parent nodes and ii) a subset of the plurality of child nodes connected to the given sub-child node in the graph structure such that, the web-resource edge length of each one of the plurality of web-resource edges connecting the given sub-child node with the subset of the plurality of parent nodes and the subset of the plurality of child nodes is a representative of the second assigned trust score; apply the shortest-path algorithm for calculating an overall shortest-path of all respective paths from the zero-vertex node to each sub-child node, each one of the respective paths including the given zero-vertex edge and the plurality of web-resource edges connecting the given parent node, the given child node, and the given sub-child node; and determine, based on the overall shortest-path, the at least one web-resource of the plurality of web-resources such that, the at least one web-resource is prioritized for the malicious data assessment.

In some embodiments of the processing server, wherein the shortest-path algorithm corresponds to at least one of: i) Dijkstra's algorithm; ii) Breadth-first search (BFS); iii) Mikkel Thorup's algorithm for undirected single-source shortest paths with positive integer weights in linear time; iv) Bellman-Ford algorithm.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, the expression "content" includes content of any nature or kind whatsoever capable of being stored in a database. Thus, content includes, but is not limited to audiovisual works (images, movies, sound records, presentations etc.), data (location data, numerical data, etc.), text (opinions, comments, questions, messages, etc.), documents, spreadsheets, hyperlinks etc.

In the context of the present specification, the expression "document" is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A page may correspond to a document or a portion of a document. Therefore, the words "page" and "document" may be used interchangeably in some cases. In other cases, a page may refer to a portion of a document, such as a sub-document. It may also be possible for a page to correspond to more than a single document.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE FIGURES

Further features and advantages of the present technology will become apparent from the following detailed description, taken in combination with the appended drawings, in which.

Figure 1:
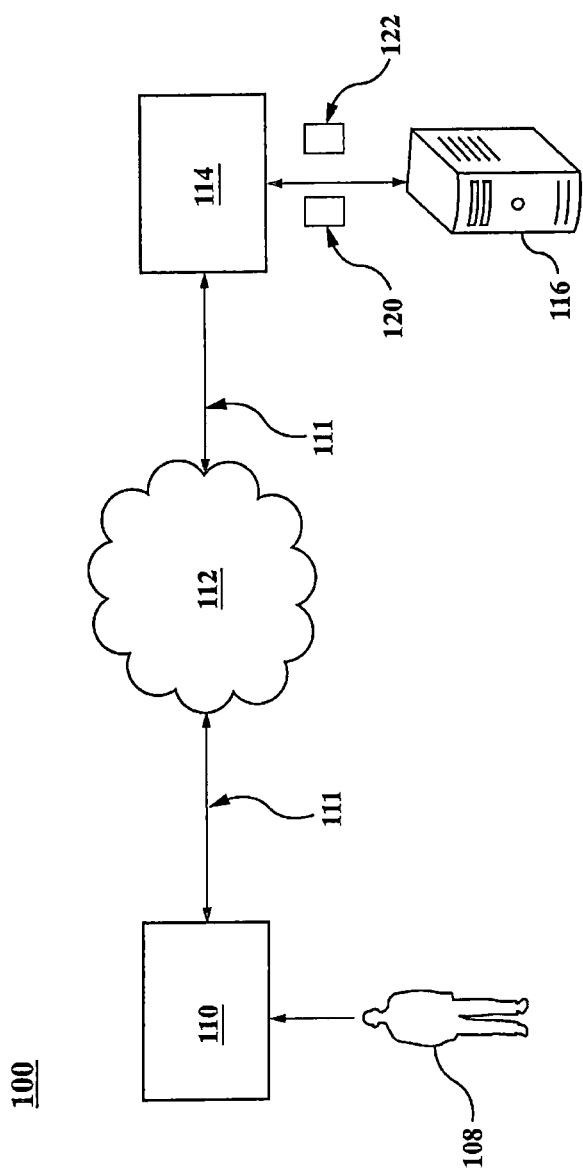
FIG. 1 depicts a schematic diagram depicting a system, the system being implemented in accordance with various non-limiting embodiments of the present technology.

It is to be understood that throughout the appended drawings and corresponding descriptions, like features are identified by like reference characters. Furthermore, it is also to be understood that the drawings and ensuing descriptions are intended for illustrative purposes only and that such technology do not provide a limitation on the scope of the claims.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

As has been alluded above, an increase in usage of internet has resulted in an increase in the publishing of content on the internet. For example, the published content may be user generated, such as comments posted on social media and e-commerce websites; or alternatively content published on recommendation platforms such as Yandex Zen™. Similarly, the published content may be non-user generated, such as news articles provided on news aggregator platforms.

With such an increase in the amount of content being published online, there is a need to analyze the content being published or pending to be published. The content is to be analyzed for any malicious data in order to protect users accessing the content and to protect a prestige of the online platform.

In the context of the present technology, the term "malicious data" may include malwares designed to infiltrate, compromise, or damage a computer system without the user's informed consent. A malware may be a virus, a worm, a Trojan horse, a botnet, a spyware, an adware and any other malicious and unwanted software. Generally speaking, worms may replicate themselves across a computer network to quickly infect a large number of computer systems. Trojan horses may be disguised as legitimate software residing on the computer systems and computer networks and attempt to steal the user's identification, password, and other personal information. Botnets are groups of infected computer systems that are remotely controlled in which individual bots (computer systems) may be instructed to send SPAM email or participate in denial of service attacks. Spyware is designed to capture keystrokes, credit card numbers, and other personal information. Adware may infect a computer system by downloading and displaying unwanted advertisements. In addition to the malwares, the malicious data may include some unwanted videos, audios, images, document or text which could be offensive, or illicit otherwise.

It is further contemplated that the content to be published may include hyperlinks to other web-resources. Needless to say, it is probable that such content or the other web-resources linked to the content may include malicious data.

In order to determine malicious data, various conventional techniques suggest traversing a large number of associated web-resources. In order to assess the malicious data, traversing a large number of web-resources may be expensive in terms of computational resources as it may require substantial processing since there is a need to verify the presence of malicious data not only within the content being published, but also in any web-resources linked by hyperlink to the content, and so on.

System

With this said, FIG. 1 depicts a system 100 for malicious data assessment among various web-resources, in accordance with various non-limiting embodiments of the present technology. The system 100 may include multiple client devices 110 (for the purpose of simplicity only one client device 110 has been illustrated) located at different geographic locations that are configured to communicate with each other with a communication network 112 via a communication link 111. Further, the client device 110 may communicate with one or more web servers such as a web server 114 with the communication network 112 via the communication link 111 (for the purpose of simplicity only one web server 114 has been illustrated). The web server 114 may be coupled to one or more processing servers such as a processing server 116 (for the purpose of simplicity only one processing server 116 has been illustrated).

How the communication link 111 is implemented is not particularly limited and depends on how the client device 110, the web server 114 and the processing server 116 have been implemented. For example, the communication link 111 can be implemented as a wireless communication link (such as, but not limited to, a 3G communications network link, a 4G communications network link, a Wireless Fidelity, or WiFi®, for short, Bluetooth®, or the like) or as a wired communication link (such as an Ethernet based connection).

In some non-limiting embodiments of the present technology, the communication network 112 can be implemented as the Internet. In other non-limiting embodiments of the present technology, the communication network 112 can be implemented differently, such as any wide-area communication network, local area communications network, a private communications network and the like.

In certain non-limiting embodiments, the client device 110 may be associated with a user 108. The user 108 may be an individual user of personal computers, laptops, desktops, or the like or a part of network such as, client devices in an organization, etc. Even though a single user 108 has been depicted in FIG. 1, it is for the purpose of the simplicity of illustration. In various non-limiting embodiments, multiple users 108 may be associated with multiple client devices 110.

It is to be noted that the terms "user 108" (referring to a single user) and "multiple users 108" (referring to multiple users) may be used herein interchangeable depending upon the embodiments these terms are being used without departing from the principles presented in the current technology. Similarly, the term "client device 110" (single client device) and "multiple client devices 110" (referring to multiple client devices) may be used herein interchangeable depending upon the embodiments these terms are being used without departing from the principles presented in the current technology.

Also, it is contemplated that although the web server 114 and the processing server 116 have been illustrated as separate entities, however, in various non-limiting embodiments, the processing server 116 may be a part of the web server 114. In yet another non-limiting embodiment, the web server 114 and the processing server 116 may be the same entity.

Client Device

Figure 2:
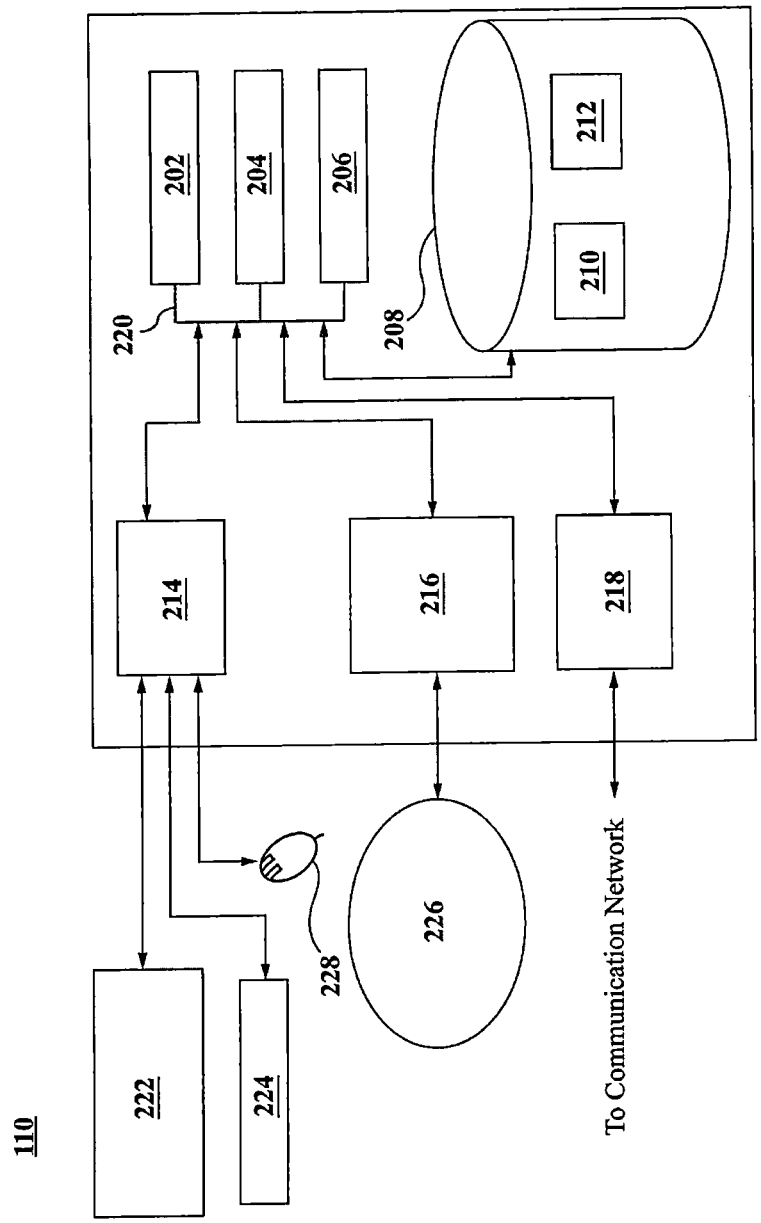
FIG. 2 depicts a high-level functional block diagram of a client device of the system of FIG. 1, in accordance with various non-limiting embodiments of the present technology.

FIG. 2 depicts a high-level block diagram of components of the client device 110, in accordance with various non-limiting embodiments of the present technology. It should be appreciated that FIG. 2 provides only an illustration of one implementation of the client device 110 and does not imply any limitations with regard to the systems in which different embodiments may be implemented. Various modifications to the depicted system 100 may be done to implement the client device 110 without departing from the principles presented herein. The client device 110 may be a server, a desktop computer, a laptop computer, or any device that may be configured to implement the present technology, as should be understood by a person skilled in the art.

As shown, the client device 110 employs one or more different type of processors 202, one or more computer-readable random access memories (RAMs) 204, one or more computer-readable read only memories (ROMs) 206, one or more computer-readable storage media 208, device drivers 214, a read/write (R/W) driver interface 216, a network interface 218, all interconnected over a communication fabric 220. The communication fabric 220 may be implemented by any architecture designed for communicating data and/or control information between processors (such as microprocessors, communications and network processors, etc.), system memory, peripheral devices, and any other hardware components within a system.

The processor 202 of the client device 110 may include one or more of a CPU, an accelerator, a microprocessor, GPU, an NPU, an ASIC, a FPGA, a dedicated logic circuitry, a dedicated artificial intelligence processor unit, or combinations thereof.

One or more operating systems 210 and one or more application programs 212 (examples of application programs may include programming instructions) are stored on one or more of computer-readable storage media 208 for execution by one or more of the processors 202 via one or more of respective random access memory(s) (RAMs) 204 (which typically include a cache memory). In the illustrated embodiment, each of the computer-readable storage media 208 maybe embodied as a magnetic disc storage device of an internal hard drive, compact disc read-only memory (CD-ROM), digital video disc (DVD), memory stick, magnetic tape, magnetic disk, optical disk, a semiconductor storage device such as RAM, read-only memory (ROM), erasable programmable read-only memory (EPROM), flash memory or any other computer-readable tangible storage device that can store a computer program and digital information.

The R/W driver interface 216 reads from and writes to one or more portable computer-readable storage media 226. The application programs 212 may be related to the malicious data assessment among various web-resources and stored on one or more of portable computer-readable storage media 226, read via the respective R/W driver interface 216 and loaded into the respective computer-readable storage media 208.

Further, the network interface 218 may be based on a transmission control protocol/internet protocol (TCP/IP) adapter card or wireless communication adapter (such as a wireless communication adapter using orthogonal frequency division multiple access (OFDMA) technology). The application programs 212 on the client device 110 may be downloaded to the client device 110 from an external computer or external storage device via a communication network (for example, the Internet, a local area network or other wide area network or wireless network) and the network interface 218. From the network interface 218, the application programs 212 may be loaded onto the computer-readable storage media 208. The client device 110 may connect to routers, firewalls, switches, gateway computers and/or edge servers of the communication network using copper wires, optical fibers, wireless transmission, and the like.

The client device 110 may also include a display screen 222, a keyboard or keypad 224, and a computer mouse or touchpad 228. The device drivers 214 may interface with display screen 222 for imaging, with the keyboard or the keypad 224, with computer mouse or touchpad 228, and/or with display screen 222 (which may be a touch sensitive display) for alphanumeric character entry and user selections. The device drivers 214, R/W driver interface 216 and network interface 218 may comprise hardware and software (stored on the computer-readable storage media 208 and/or the ROM 206).

Server

Figure 3:
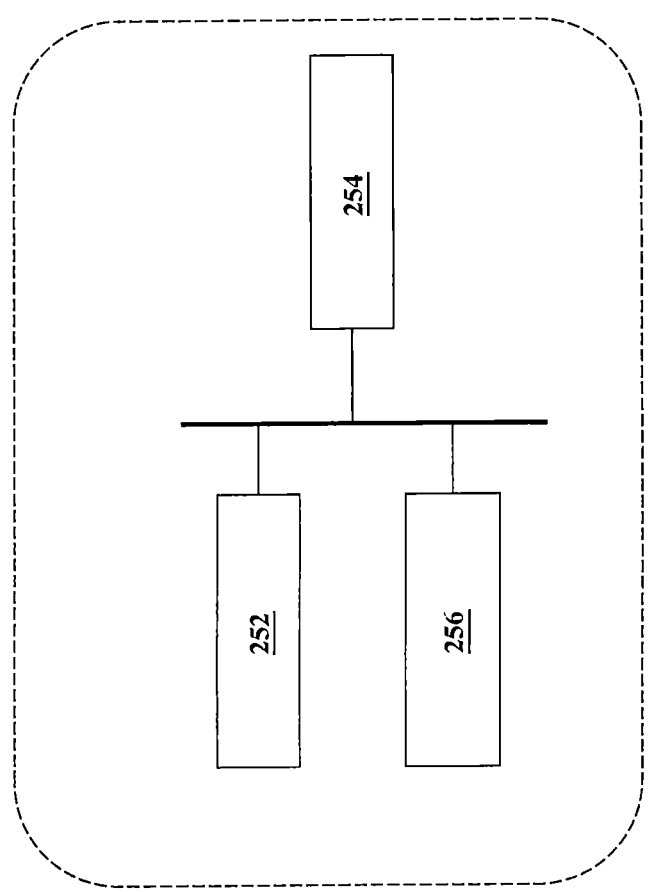
FIG. 3 depicts a high-level functional block diagram of a server of the system of FIG. 1, in accordance with various non-limiting embodiments of the present technology.

FIG. 3 depicts a high-level functional block diagram of the web server 114 of system 100 of FIG. 1, in accordance with various non-limiting embodiments of the present technology. In the depicted embodiment, the web server 114 may be embodied as a physical machine (e.g., a physical server) or virtual machine (e.g., a virtual server) that executes application programs to enable the client devices 110 to communicate with the web server 114. The web server 114 may include a processor 252, a memory 254, and a network interface 256 among other standard components. It is to be noted that the web server 114 may include other components but have not been illustrated for the purpose of simplicity.

The processor 252 of the web server 114 may include one or more of a CPU, an accelerator, a microprocessor, a GPU, an ASIC, a FPGA, a dedicated logic circuitry, a dedicated artificial intelligence processor unit, or combinations thereof.

The memory 254 may include volatile memory (e.g., RAM) and non-volatile or non-transitory memory (e.g., a flash memory, magnetic storage, and/or a ROM). The non-transitory memory(ies) stores a platform that controls the overall operation of the web server 114. The platform, when executed by the processor 252, implements application programs related to the malicious data assessment among various web-resources.

The network interface 256 may include one or more wireless transceivers configured for wireless communications with the communication network 112, or one or more network adaptors configured for wired communications with the communication network 112. In general, the network interface 256 may be configured to correspond with the network architecture of that is used to implement a link for communications between the web server 114 and the communication network 112. In certain embodiments, the network interface 256 may be implemented in a similar manner as the network interface 218 has been implemented.

It is to be noted that the web server 114 is shown as a standalone computer. However, the implementation of various other embodiments of the present technology may include any client-server model where client devices may run a client version of the application programs related to prioritizing web-resources for malicious data assessment. Other examples of the web server 114 may include a distributed computing system that runs the server version of the application programs related to the malicious data assessment among various web-resources, a virtual machine (or virtual machines) instantiated by the infrastructure of a public or private cloud, or a cloud service provider that provides the application programs related to the malicious data assessment among various web-resources as system as a service (SaaS). Such implementations or any other similar implementation should not limit the scope of the present technology.

Further, it is contemplated that the processing server 116 may be implemented in a similar manner as the web server 114 has been implemented without limiting the scope of present technology.

The web server 114 may be associated with an online platform that may allow the multiple users 108 associated with multiple client devices 110 to publish content. In various non-limiting embodiments, the content may be accessible to the multiple users 108 by means of a user interface (UI) associated with the online platform. In certain non-limiting embodiments, the online platform may be accessible by means of a web browser or a web-based application stored on one or more of computer-readable storage media 208 as one or more application programs 212 of the client device 110. In various non-limiting embodiments, the multiple users 108 may perform various activities on the online platform via the web browser or the web-application installed on the client devices 110. Such activities may include but are not limited to browsing the content posted on the online platform, performing various actions such as providing user ratings to the content and even posting some content or the like.

In certain non-limiting embodiments, the user 108 may submit a content to be published as a web-resource. The web-resource submitted by the user 108 may contain one or more hyperlink(s) to other web-resources, and as such would be referred herein as a "parent web-resource". It is contemplated that the parent web-resources may include a video file, an audio file, a text file, an image, an executable file, hyperlinks to other web-based content such as, another web page, or the like. These other web-based content associated with the parent web-resources may be referred to as child web-resources. In yet another embodiment, the child web-resources may include hyperlinks to other web-based, such web-based content may be referred to as sub-child web-resources.

It is contemplated that hyperlinks from parent web-resources to child web-resources or from child web-resources to sub-child web-resources may be embedded in any suitable technique known in the art such as, a direct hyperlink, a hyperlink embedded in text, images or videos or the like without limiting the scope of present technology.

Some of the non-limiting examples of web-resources may include a post on social media platform, a video file or an audio file on the media platform, a blog or an article on a website, a review or a comment on a product on an e-commerce website. The above list is non-exhaustive and various other examples may be included where the user 108 may publish any sort of content on the online platform without limiting the scope of present technology.

Since the number of web-resources including the parent web-resources, child web-resources, and sub-child web-resources may be very large in number. The developers of the present technology have devised methods and systems to effectively assess such a large number of web-resources for malicious data.

Method for Assessing Web-Resources

In various embodiments of the present technology, there is provided a method 300 for scheduling a plurality of web-resources for malicious data assessment. The method 300 may be executed by the processing server 116 accessible by one or more web servers 114 hosting the plurality of web-resources. Various steps of the method 300 will now be described in greater details.

Step 302: Receiving a Plurality of Requests to Publish the Plurality of Web-Resources The method 300 commences at step 302 where the processing server 116 receives a plurality of requests to publish the plurality of web-resources. Referring to FIG. 1, in certain non-limiting embodiments, the multiple client devices 110 may request the web server 114 to publish the respective content via the web browser or the web application associated with the online platform installed on the multiple client devices 110. However, there may be certain scenarios, where such requests may be generated by aggregators or botnets.

In certain embodiments, the multiple users 108 may be directly associated with the online platform which the web server 114 is hosting. By way of an example, the multiple users 108 may require registering them with the online platform in order to publish the content. The registering may be based on one or more of the associated email addresses, phone numbers, usernames or the like. In order to request to publish the content, the multiple users 108 may be require to login to the online platform the suitable credentials.

In certain non-limiting embodiments, the online platform associated with the web server 114 may allow one or more of the multiple users 108 to request publishing of content without logging into the online platform. It is to be noted that how the multiple users 108 are associated with the online platform should not limit the scope of the present technology.

Once the multiple users 108 have requested to publish web-resources using the multiple client devices 110, the web server 114 in return may forward an indication of the plurality of requests to the processing server 116, which includes the web-resources. In FIG. 1, the plurality of requests jointly have been illustrated as requests 120.

Step 304: Generating a Graph Structure and Assigning Trust Scores

The method 300 proceeds to step 304, where the processing server 116 generates a graph structure from the plurality of web-resources 122 and assigns a trust score to nodes in the graph structure.

Figure 5:
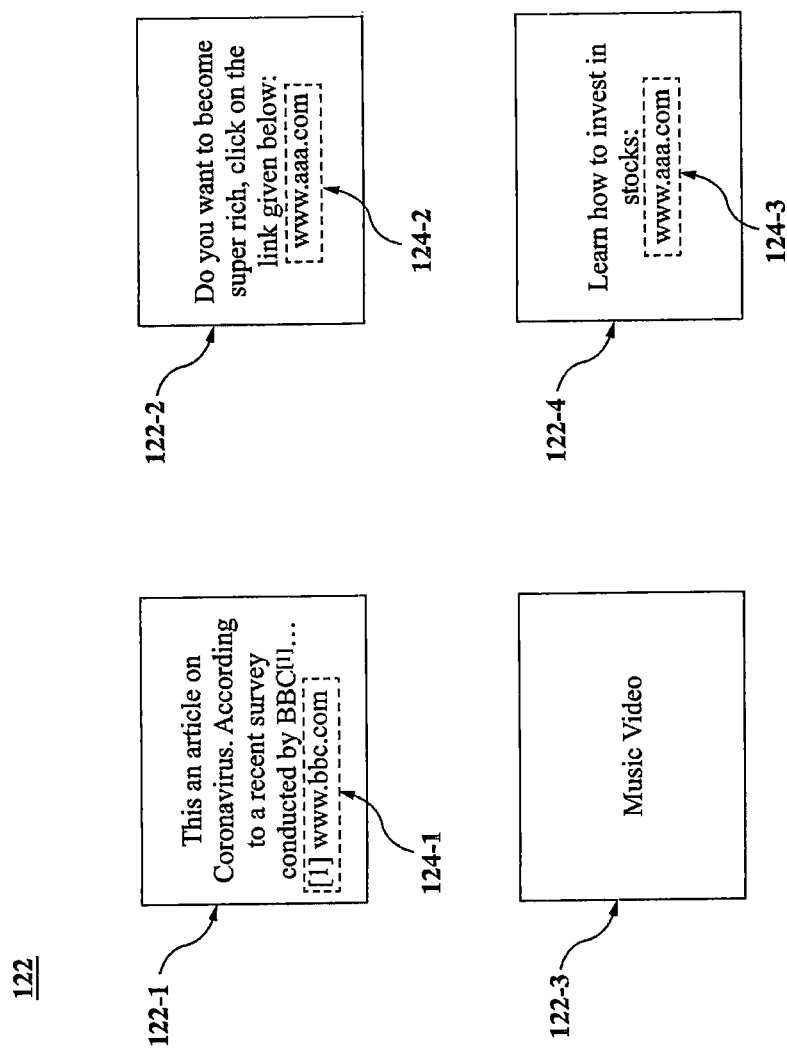
FIGS. 5 and 6 depict schematic illustrations of web-resources accessible by the client device of the system of FIG. 1.

Referring now to FIG. 5, which depicts some of the non-limiting examples of the plurality of web-resources 122, in accordance with various embodiments of present technology.

As depicted, the plurality of web-resources 122 may include various web-resources 122-1, 122-2, 122-3, and 122-4. Each one of the plurality of web-resources 122 may be associated with the request to publish content submitted by the respective user 108 via the respective client device 110. Since the web-resources 122-1, 122-2, 122-3, and 122-4 may be directly associated with the respective users 108, to this end, in various non-limiting embodiments, the web-resources 122-1, 122-2, 122-3, and 122-4 may be referred to as parent web-resources respectively.

As has been alluded above, one or more parent web-resources 122-1, 122-2, 122-3, and 122-4 may include one or more hyperlinks to one or more webpages. Such webpages linked by a hyperlink from the parent web-resource may be referred to as child web-resources of the given parent web-resource. By way of examples, the parent web-resource 122-1 may include a child web-resource 124-1, the parent web-resource 122-2, may include a child web-resource 124-2, the parent web-resource 122-3 is just a music video and may not include any other child web-resource, and the parent web-resource 122-4 may include a child web-resource 124-3.

Figure 6:
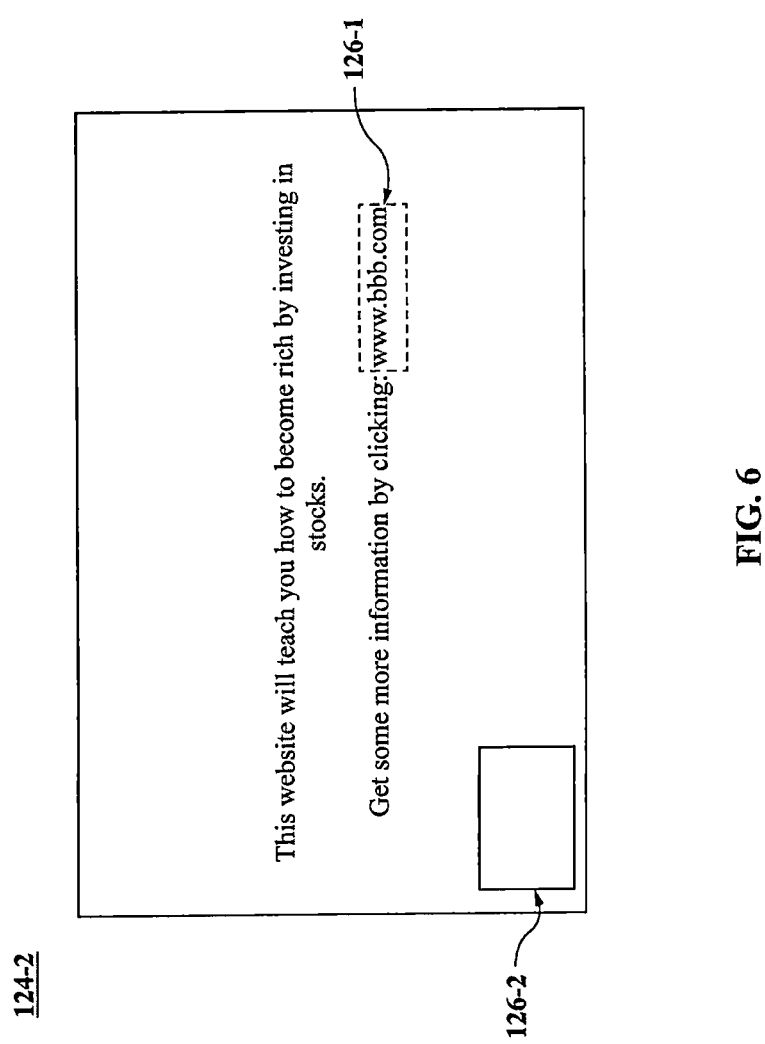

FIG. 6 depicts a representative example of child web-resource 124-2, in accordance with various non-limiting embodiments of present technology. The child web-resource 124-2 includes hyper links to other web-resources, a given one of the such web-resources may be referred to as a child web-resource vis-a-vis the child web-resource 124-2 or a sub-child web-resource vis-a-vis the parent web-resource 122-2. Some of the depicted examples may include sub-child web-resources 126-1 and 126-2. The sub-child web-resource 126-1 may be a destination of a direct hyperlink to another web-resource, whereas, the sub-child web-resource 126-2 may represent an advertisement and a hyperlink may be embedded in the advertisement.

It is to be understood that the parent web-resources 122-1, 122-2, 122-3, and 122-4, the child web-resources 124-1, 124-2, and 124-3 and the sub-child web-resources 126-1, and 126-2 have been illustrated merely for representation purposes and are not intended to be limitative. In certain embodiments, the parent web-resources 122-1, 122-2, 122-3, and 122-4, the child web-resources 124-1, 124-2, and 124-3 and the sub-child web-resources 126-1, and 126-2 conjunctly be referred to as plurality of web-resources 122.

In some non-limiting embodiments of the present technology, the processing server 116 is configured to analyze and parse the hyperlinks from each one of the parent web-resources 122-1, 122-2, and 122-3, the child web-resources 124-1, 124-2, and 124-3 and the sub-child web-resources 126-1 and 126-2 and so on. How the parsing is executed is not limited and is generally known in the art. For example, the processing server 116 may analyze the source code of the web-resources to identify the hyperlinks.

The number of the plurality of web-resources 122 may be very large and it is possible that the one or more of the plurality of web-resources 122 may include or be linked to a web-resource containing malicious data. For various reasons, such as to prevent multiple users 108 from accessing the malicious data, protect the prestige of the online platform, or the like, it would be of interest that the web-resources including malicious data should not be associated directly or indirectly online platform being hosted by the web server 114.

In order to identify such web-resources, typically, computationally expensive resources would be required to assess all of the plurality of web-resources 122. However, the processing server 116 may be configured to operate in such a manner that it may identify some of the web-resources over other in the plurality of web-resources 122 and prioritize them for malicious data assessment. In so doing, a computational efficiency of the processing server 116 may be improved.

Figure 7:
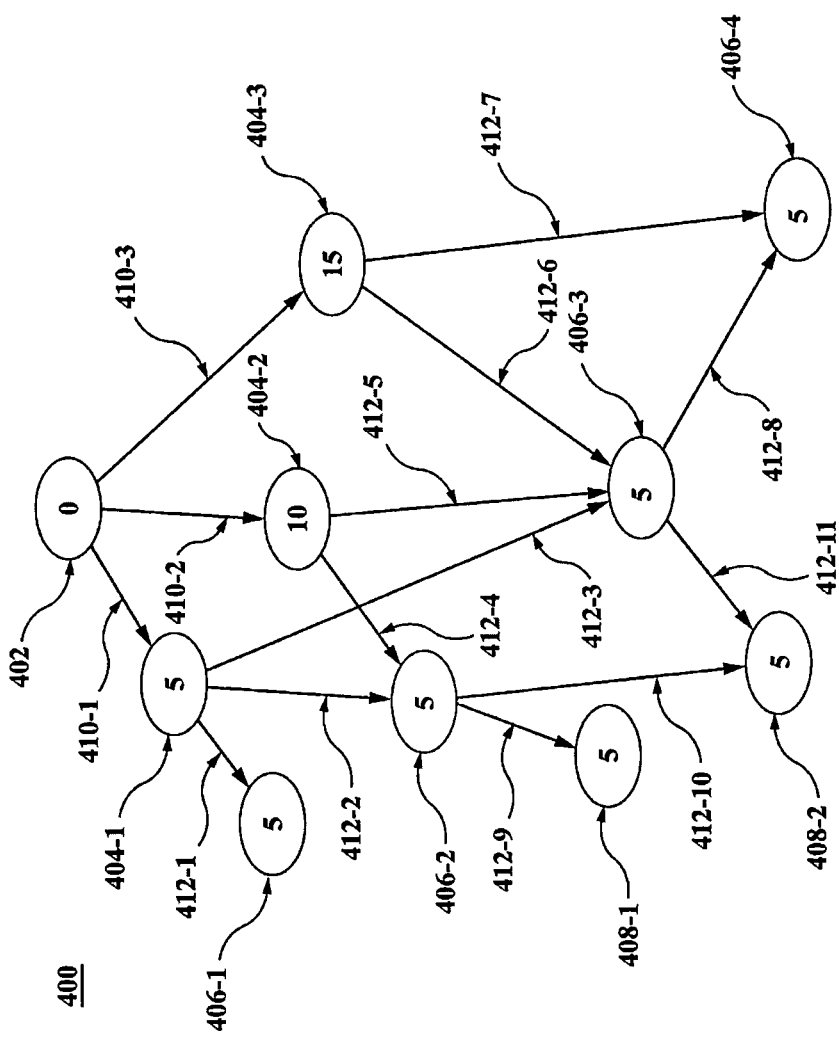
FIG. 7 depicts a graph structure generated to prioritize assessment of web-resources for malicious data, in accordance with various non-limiting embodiments of present technology.

The processing server 116 may be configured to generate a graph structure 400, as depicted in FIG. 7, to prioritize assessment of web-resources, in accordance with various non-limiting embodiments of the present technology.

In various non-limiting embodiments, the graph structure 400 may include a zero-vertex node 402, a plurality of parent nodes 404-1, 404-2, and 404-3, a plurality of child nodes 406-1, 406-2, 406-3, and 406-4, and a plurality of sub-child nodes 408-1 and 408-2.

Each one of the plurality of parent nodes (e.g., the plurality of parent nodes 404-1, 404-2, and 404-3) may be associated with each of the parent web-resources (e.g., the parent web-resources 122-1, 122-2, 122-3). The plurality of child nodes (e.g., the plurality of child nodes 406-1, 406-2, 406-3, and 406-4) may be associated with a plurality of child web-resources (e.g., the child web-resources 124-1, 124-2, 124-3). The plurality of sub-child nodes (e.g., the plurality of sub-child nodes 408-1 and 408-2) may be associated with a plurality of sub-child web-resources (e.g., the sub-child web-resources 126-1 and 126-2).

The zero-vertex node 402 is the initial node to which the plurality of parent nodes (e.g., the plurality of parent nodes 404-1, 404-2, and 404-3) are in direct connection with. The zero-vertex node 402 does not have any association with any web-resource.

In some of the non-limiting embodiments, while generating the graph structure 400, the processing server 116 may consider all of the plurality of parent nodes 404-1, 404-2, and 404-3, the plurality of child nodes 406-1, 406-2, 406-3, and 406-4, and the plurality of sub-child nodes 408-1 and 408-2. While in other non-limiting embodiments, the processing server 116 may not consider the web-resources belonging to same domain. By way of an example, if the web-resources associated with the parent node 404-2, the child node 406-2 and the sub-child node 408-1 belong to same domain, the processing server 116 may only consider the parent node 404-2 while generating the graph structure 400, or in other words, not generate the child node 406-2 and sub-child nodes 408-1.

Further, in various non-limiting embodiments, in order to connect various nodes in the graph structure 400, the processing server 116 may be configured to determine and assign trust score (also referred to as first assigned trust score herein) to the plurality of parent nodes (e.g., the plurality of parent nodes 404-1, 404-2, and 404-3) based on the association with the plurality of parent web-resources (e.g., the parent web-resources 122-1, 122-2, 122-3).

In various non-limiting embodiments, the processing server 116 may assign trust scores to the plurality of parent nodes (e.g., the plurality of parent nodes 404-1, 404-2, and 404-3). A given trust score of a given parent node (e.g., the parent node 404-1) may represent an associated level of trust. In other words, the trust score may represent a likelihood of a web-resource (e.g., the parent web-resource 122-1) including malicious data. By way of an example, a higher trust score may be indicative that the web-resource (e.g., the parent web-resource 122-1) associated with the parent node (e.g., the parent node 404-1) is less likely to include the malicious data. On the other hand, a lower trust score may represent that the web-resource (e.g., the parent web-resource 122-1) associated with the parent node (e.g., the parent node 404-1) is more likely to include the malicious data.

In various non-limiting embodiments, the trust scores may be some numerals within a range (e.g., 0-10) without limiting the scope present technology.

The processing server 116 may rely on different techniques to assign the trust scores (discussed below).

Figure 8:
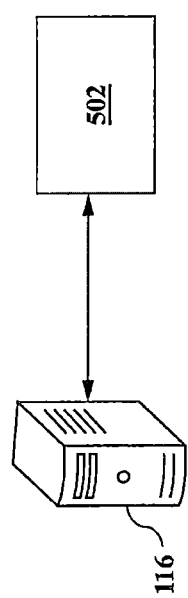
FIG. 8 depicts a first scenario for assigning trust scores, in accordance with various non-limiting embodiments of the present technology.

With reference to FIG. 8, there is depicted a first scenario for assigning the trust scores. FIG. 8 illustrates the processing server 116 coupled to a search log 502, in accordance with various non-limiting embodiments of the present technology.

In certain non-limiting embodiments, the processing server 116 may be configured to execute a search engine application, for example, Yandex™, Google™, Bing™, or the like. Such search engine applications may reside on the memory (e.g., the memory 254) associated with the processing server 116 or may be remotely available to the processing server 116.

In some non-limiting embodiments of the present technology, the search log 502 comprises previously executed search queries, search engine result pages generated in response, and user interaction with the search engine result pages (SERPs) (such as clicking a given search result, returning back to the SERP, scrolling down, and so on).

In various non-limiting embodiments, the search log 502 may reside on the processing server 116 or it may reside on separate hardware, such as a dedicated server or plurality of servers (not depicted).

In some non-limiting embodiments of the present technology, the processing server 116 is configured to assign the trust score to each of nodes based on the search log 502. In some non-limiting embodiments of the present technology, the processing server 116 is configured to assign the trust score based on at least one of two features, namely, (i) a ranking feature being indicative of an average ranking of the previous ranks of web-resources with the same domain name (or a URL) of the web-resource associated with each of the node; and (ii) an interaction feature corresponding to user interactions with web-resources having the same domain name (or a URL) of the web-resource associated with each of the node. The interaction feature being indicative of user satisfaction (e.g., rating the web-resource as good or spam) with the parent web-resource in response to interacting with the parent web-resource within the one or more search engine result pages.

The logic behind the assigning of the trust score is based on the assumption that a web-resource that were previously ranked high by the search engine application are less likely to contain malicious data, and web-resources that were the last destination of the user is indicative that the web-resource met the need of the inquiring user (thereby assuming that the content of the web-resource was high quality and without malicious data).

How the trust score is determined based on these features is not limited. In some non-limiting embodiments of the present technology, for a given node, the processing server 116 is configured to determine its ranking feature represented as a value (ex. a score between 1 to 10) and the interaction feature as a value and to combine the two features in order to obtain the trust score.

Figure 9:
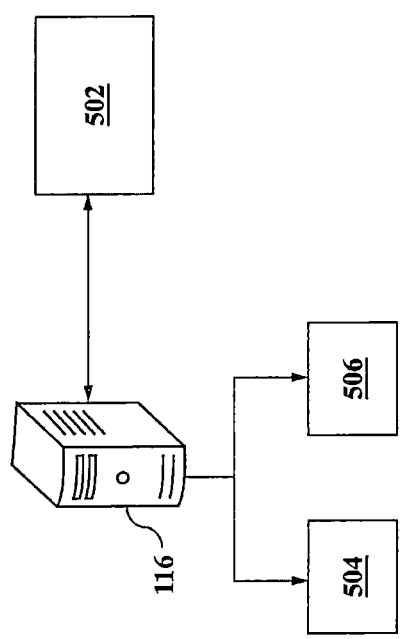
FIG. 9 depicts a second scenario for determining the trust scores, in accordance with various non-limiting embodiments of the present technology.

Referring now to FIG. 9, which depicts a second scenario for determining the trust score. The processing server 116 is coupled to the search log 502, a first list 504 comprising a first set of web-resources, and a second list 506 comprising a second set of web-resources, in accordance with various non-limiting embodiments of the present technology.

As depicted, in various non-limiting embodiments, the processing server 116 may have access to the first list 504 comprising a first set of web-resources labelled as being non-malicious web-resources and a second list 506 comprising a second set of web-resources labelled as being malicious web-resources. In some embodiments, the first list 504 and the second list 506 may be generated based on human moderators labelling the web-resources as non-malicious or malicious. In other non-limiting embodiments, the processing server 116 may generate the first list 504 and the second list 506 based on previously generated SERPs stored within the search log 502. If the SERPs contained the web-resources as top-ranked results, the processing server 116 may include such web-resources in the first list 504.

The processing server 116 may be configured to search the parent web-resource (e.g., the parent web-resource 122-1) associated with the parent node (e.g., the parent node 404-1) in the first list 504 and the second list 506. If the parent web-resource (e.g., the parent web-resource 122-1) is included in the first list 504, the processing server 116 may assign a first trust score to the parent node (e.g., the parent node 404-1). If the parent web-resource (e.g., the parent web-resource 122-1) is included in the second list 506, the processing server 116 may assign a second trust score to the parent node (e.g., the parent node 404-1). In case, the parent web-resource (e.g., the parent web-resource 122-1) is neither included in the first list 504, or the second list 506, the processing server 116 may assign a third trust score to the parent node (e.g., the parent node 404-1).

Since, the first trust score may be associated with a non-malicious web-resource, and the second trust score may be associated with a malicious web-resource, in various non-limiting embodiments, the first trust score may be greater than the second trust and the third trust score. Regarding the third trust score, since the associated web-resource may be ambiguous regarding the malicious data, to this end, in certain non-limiting embodiments, the third trust score may be greater than the second trust score but less than the first trust score.

In various non-limiting embodiments, the processing server 116 may be configured to assign either the first trust score, the second trust score, or the third trust score to all of the plurality of parent nodes (e.g., the parent nodes 404-1, 404-2, and 404-3) in the graph structure (as depicted in FIG. 7) based on the association of the parent web-resources (e.g., the parent web-resources 122-1, 122-2, 122-3, etc.) with the first list 504 and the second list 506.

It is to be noted that how the processing server 116 assigns the trust scores to the plurality of parent nodes (e.g., the parent nodes 404-1, 404-2, and 404-3) should not limit the scope of present technology.

Referring back to FIG. 7, as an example, in the graph structure 400, the processing server 116 may assign a trust score equal to 5 to the parent node 404-1, a trust score equal to 10 to the parent node 404-2 and a trust score equal to 15 to the parent node 404-3.

In various non-limiting embodiments of the present technology, the processing server 116 may be configured to generate a plurality of zero-vertex edges, for example, the zero-vertex edges 410-1, 410-2 and 410-3 (as illustrated in FIG. 7) in such a manner that a zero-vertex edge length of each one of the plurality of zero-vertex edges (e.g., the zero-vertex edges 410-1, 410-2 and 410-3) representing the trust scores associated with an associated one of the plurality of parent nodes (e.g., the parent nodes 404-1, 404-2, and 404-3). The processing server 116 may connect the plurality of parent nodes (e.g., the parent nodes 404-1, 404-2, and 404-3) with the zero-vertex node (e.g., the zero-vertex node 402) via the plurality of zero-vertex edges (e.g., the zero-vertex edges 410-1, 410-2 and 410-3).

By way of an example, the zero-vertex edge length of the zero-vertex edge 410-1 may be in accordance a trust score equal to 5 assigned to the parent node 404-1, the zero-vertex edge length of the zero-vertex edge 410-2 may be in accordance a trust score equal to 10 assigned to the parent node 404-2, and the zero-vertex edge length of the zero-vertex edge 410-3 may be in accordance a trust score equal to 15 assigned to the parent node 404-3 and so on. As the trust score assigned to the parent node 404-1 is less than the trust score assigned to parent nodes 404-2 and 404-3, the zero-vertex edge length of the zero-vertex edge 410-1 may be shorter than the zero-vertex edge length of the zero-vertex edge 410-2 and the zero-vertex edge length of the zero-vertex edge 410-3. In a similar manner, the zero-vertex edge length of the zero-vertex edge 410-2 may be shorter than the zero-vertex edge length of the zero-vertex edge 410-3.

Once all of the plurality of parent nodes (e.g., the parent nodes 404-1, 404-2, and 404-3) are connected to the zero-vertex node (e.g., the zero-vertex node 402), the processing server 116 may be configured to generate a plurality of web-resource edges, for example the web-resource edges 412-1, 412-2, . . . 412-11 (as illustrated in FIG. 7). It is to be noted that the web-resource edges 412-1, 412-2, . . . 412-11 are not drawn to the scale.

The plurality of web-resource edges (e.g., the web-resource edges 412-1, 412-2, . . . 412-11) may connect the plurality of parent nodes (e.g., the parent nodes 404-1, 404-2, and 404-3) to the associated plurality of child nodes (e.g., the child nodes 406-1, 406-2, 406-3, and 406-4) and the associated plurality of sub-child nodes (e.g., the sub-child nodes 408-1 and 408-2).

In one example, the given web-resource edge 412-1 of the plurality of web-resource edges 412-1, 412-2, . . . 412-11 may connect the given parent node 404-1 of the plurality of parent nodes 404-1, 404-2, and 404-3 to the given child node 406-1 of the plurality of child nodes 406-1, 406-2, 406-3, and 406-4 such that, a given parent web-resource 122-1 associated with the given parent node 404-1 may be linked to the given child web-resource 124-1 associated with the given child node 406-1 by virtue of a hyperlink from the given parent web-resource 122-1 to the given child node 124-1.

In a similar manner, the given web-resource edge 412-9 of the plurality of web-resource edges 412-1, 412-2, . . . 412-11 may connect the given child node 406-2 of the plurality of child nodes 406-1, 406-2, 406-3, and 406-4 to the given sub-child node 408-1 of the plurality of sub-child nodes 408-1 and 408-2 such that, a given child web-resource 124-2 associated with the given child node 406-2 may be linked to a given child web-resource 124-2 associated with the given sub-child node 408-1 by virtue of a hyperlink from the given child web-resource 124-2 to the given sub-child web-resource 126-1.

It is contemplated that a given node (e.g. the child node 406-4) may be a child node with respect to another node (e.g., the parent node 404-3), if there is a direct hyperlink from the web-resources associated with one node (e.g., the parent node 404-3) to the web-resource associated with another node (e.g., the child node 406-4). However, the same given node (e.g., the child node 406-4) may be a sub-child node with respect to some other node (e.g., the child node 406-3), if there is a direct hyperlink between the web-resources associated with the two nodes (e.g., the child node 406-3 and the child node 406-4). Even though, the node 406-4 has been referred to the child node 406-4 with respect to the parent node 404-3, however, in various non-limiting embodiments, the node 406-4 may be referred to as sub-child node 406-4 with respect to the child node 406-3 without limiting the scope of the present technology.

In various non-limiting embodiments, a given child node may be connected to more than one parent node provided that the parent nodes have a hyperlink to the given child node. By way of an example, as illustrated in FIG. 7, the child node 406-3 may be connected to the parent nodes 404-1, 404-2, and 404-3. In a similar manner, a given sub-child node may be connected to one or more parent nodes as well as one or more child nodes provided that the parent nodes and the child nodes have a hyperlink to the given such-child node. By way of an example, as illustrated in FIG. 7, the child node 406-4 may be connected to the parent node 404-3 and the child node 406-3.

Once all the nodes in the graph structure 400 have been connected via the zero-vertex edges 410-1, 410-2 and 410-3 or the web-resource edges 412-1, 412-2, . . . 412-11, the processing server 116 maybe configured to assign trust scores (also referred to as second assigned trust scores herein) to the plurality of child nodes (e.g., the child nodes 406-1, 406-2, 406-3, and 406-4) and to the plurality of sub-child nodes (e.g., the sub-child nodes 408-1 and 408-2) based on the trust scores assigned to the plurality of parent nodes (e.g., the parent nodes 404-1, 404-2, 404-3).

In various non-limiting embodiments, if a given child node (e.g., the child node 406-1) is connected only to one parent node (e.g., the parent node 404-1), the given child node (e.g., the child node 406-1) may inherent a trust score of the associated parent node (e.g., the parent node 404-1). The inheritance of trust score, in this case, may be based on a fact that the given child node (e.g., the child node 406-1) may be equally trustable (in terms of malicious data) as the associated parent node (e.g., the parent node 404-1).

However, if a given child node (e.g., the child node 406-2) is connected to a multiple/subset parent nodes (e.g., the parent nodes 404-1 and 404-2), the processing server 116 may assign to the given child node (e.g., the child node 406-2) a trust score based on a lowest trust score of the subset (e.g., the parent nodes 404-1 and 404-2) of the plurality of parent nodes (e.g., the parent nodes 404-1, 404-2 and 404-3) connected to the given child node (e.g., the child node 406-2) in the graph structure 400. The inheritance of trust score, in this case, may be based on a fact that if a less trusted parent web-resource is citing a child web-resource, it is more likely that the child web-resource may include the malicious data even though, the child web-resource may be linked to some another highly trusted parent web-resource.

By way of an example, the child node 406-1 being connected only to the parent node 404-1 may inherit the associated trust score equal to 5. On the other hand, the child node 406-2, being connected to the parent nodes 404-1 and 404-2 may inherit the lowest associated score equal to 5, in this case.

In a similar manner, the processing server 116 may assign the trust scores to the plurality of sub-child nodes (e.g., the sub-child nodes 408-1 and 408-2) based on the trust score assigned to the plurality of parent nodes (e.g., the parent nodes 404-1, 404-2, and 404-3) and to the plurality of child nodes (e.g., the child nodes 406-1, 406-2, and 406-3).

In various non-limiting embodiments, if a given sub-child node (e.g., the sub-child node 408-1) is connected only to one child node (e.g., the child node 406-2), the given sub-child node (e.g., the sub-child node 408-1) may inherent a trust score of the associated child node (e.g., the child node 406-2). The inheritance of trust score, in this case, may be based on a fact that the given sub-child node (e.g., the sub-child node 408-1) may be equally trustable (in terms of malicious data) as the associated child node (e.g., the child node 406-2).

However, if a given sub-child node (e.g., the sub-child node 408-2) is connected to a multiple/subset child nodes (e.g., the child nodes 406-2 and 406-3), the processing server 116 may assign to the given sub-child node (e.g., the sub-child node 408-2) a trust score based on a lowest trust score of the subset (e.g., the child nodes 406-2 and 406-3) of the plurality of child nodes (e.g., the child nodes 406-1, 406-2, 406-3 and 406-4) connected to the given sub-child node (e.g., the sub-child node 408-2) in the graph structure 400.

In yet another non-limiting embodiment, if a given node (e.g., the child node 406-4) is connected to one or more parent nodes (e.g., the parent node 404-3) and is connected to one or more child nodes (e.g., the child nodes 406-3), the processing server 116 may assign to the given node (e.g., the child node 406-4) an overall lowest trust score of i) a subset of the plurality of parent nodes (e.g., the parent node 404-3) and ii) a subset of the plurality of child nodes (e.g., the child node 406-3) connected to the given node (e.g., the child node 406-4) in the graph structure 400.

The inheritance of the trust score, in this case, may be based on a fact that if a less trusted child web-resource is citing a sub-child web-resource, it is more likely that the sub-child web-resource may include the malicious data even though, the sub-child web-resource may be linked to some another highly trusted child web-resource.

Although, in the above non-limiting embodiments, the lowest trust score traverses down the graph structure 400, in various other non-limiting embodiments, the processing server 116 may be configured to alter the trust scores assigned to the sub-child nodes in a predetermined manner.

Figure 10:
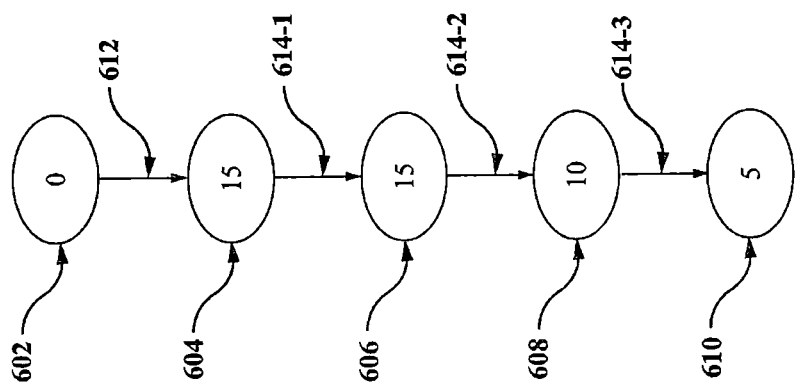
FIG. 10 depicts a representative graph structure, in accordance with various non-limiting embodiments of the present technology.

FIG. 10 depicts a representative graph structure 600, in accordance with various non-limiting embodiments of the present technology. The graph structure 600 may be generated by the processing server 116 in a similar manner as the graph structure 400 (as shown in FIG. 7) has been generated in response to receiving a request to publish a content. As depicted, the graph structure 600 may include a zero-vertex node 602, a parent node 604, a child node 606, and sub-child nodes 608 and 610. The zero-vertex node 602 may be connected to the parent node 604 via a zero-vertex edge 612, the parent node 604, the child node 606, and the sub-child nodes 608 may be connected via web-resource edges 614-1, 614-2, and 614-3.

It is contemplated that the graph structure 600 may include other parent nodes, child nodes, sub-child nodes and web-resource edges but have been omitted from the graph structure for the purpose of simplicity and illustration. The parent node 604, the child node 606, and the sub-child nodes 608 may be associated with web-resources in a similar manner as previously discussed with respect to graph structure 400.

In various non-limiting embodiments, while inheriting the lowest trust scores (as previously discussed), even the sub-child nodes (e.g., the sub-child nodes 408-1 and 408-2 in FIG. 7) were assigned the lowest trust scores. However, in certain non-limiting embodiments, the graph structure 600 may include a large number of sub-child nodes. To this end, the sub-child nodes (e.g., the sub-child nodes 608 and 610) located at lower levels in the graph structure 600 may not be equally trustworthy in terms of malicious data as the parent node (e.g., the parent node 604) and the child node (e.g., the child node 606).

With this said, the processing server 116 may alter the trust scores assigned to the sub-child nodes (e.g., the sub-child nodes 608 and 610) located at a lower level in the graph structure 600. During alteration of the trust scores, the processing server 116 may be configured to decrease the trust scores by a predetermined factor.

This representative scenario is being illustrated in the graph structure 600. The processing server 116 may assign a trust score of 15 to the parent node 604 (based on any suitable techniques discussed previously). The child node 606 may inherit the trust score of 15 from the parent node 604. However, regarding the sub-child nodes 608 and 610, the processing server 116 may decrease the trust scores of the sub-child nodes 608 and 610. In this example, the processing server 116 may assign the sub-child node 608 with a trust score equal to 10 and the sub-child node 610 may be assigned with a decreased trust score equal to 5. It is to be noted that the trust scores are merely for the purpose of illustration. In various non-limiting embodiments, a decrease in the trust scores may be performed by any suitable predetermined factor.

It is contemplated that the alteration of trust scores of the sub-child nodes (e.g., the sub-child nodes 608 and 610) located at a lower level in the graph structure 600 may be performed to reduce a distance of such sub-child nodes from the zero-vertex node (e.g., the zero-vertex node 602) and prioritizing such sub-child nodes for malicious data assessment (details will be discussed later in the disclosure).

In various non-limiting embodiments, if the lower level sub-child node 610 is connected to another parent node (not illustrated) or a sub-child node located a higher level in the graph structure 600 (not illustrated) having a lower trust score than the sub-child node 608, the lower level sub-child 610 may inherit the lower trust score.

Further, in certain non-limiting embodiments, the online platform associated with the web server 114 may operate on a postulation that if a graph structure including a large number of sub-child nodes, it is less likely that a user (e.g., the user 108) accessing a given web-resource associated with a parent node in the graph structure will traverse till the last sub-child node in the graph structure.

Figure 11:
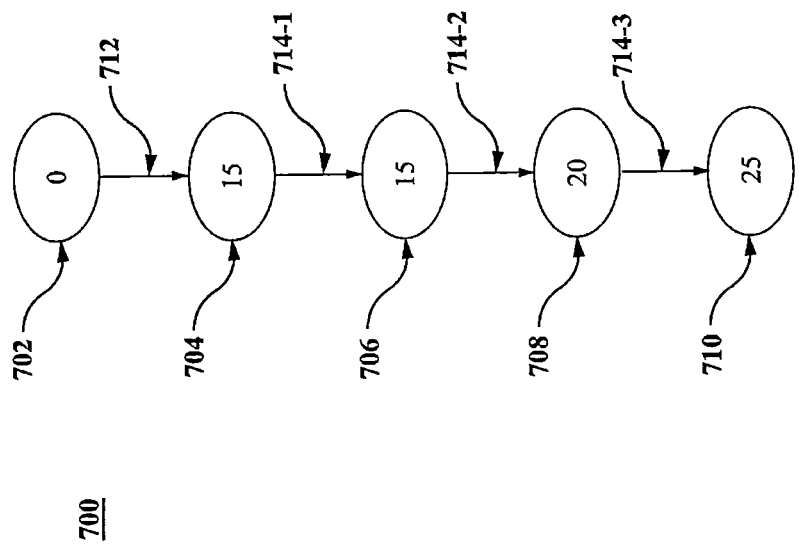
FIG. 11 depicts another representative graph structure, in accordance with various embodiments of the present technology.

With this said, FIG. 11 illustrates another representative graph structure 700, in accordance with various non-limiting embodiments of the present technology. The graph structure 700 may be generated by the processing server 116 in a similar manner as the graph structure 400 (as shown in FIG. 7) has been generated in response to receiving a request to publish a content. As depicted, the graph structure 700 may include a zero-vertex node 702, a parent node 704, a child node 706, and sub-child nodes 708 and 710. The zero-vertex node 702 may be connected to the parent node 704 via a zero-vertex edge 712, the parent node 704, the child node 706, and the sub-child nodes 708 may be connected via web-resource edges 714-1, 714-2, and 714-3.

It is contemplated that the graph structure 700 may include other parent nodes, child nodes, sub-child nodes and web-resource edges but have been omitted from the graph structure for the purpose of simplicity and illustration. The parent node 704, the child node 706, and the sub-child nodes 708 may be associated with web-resources in a similar manner as previously discussed with respect to graph structure 400.

In various non-limiting embodiments, in order to implement the above-mentioned postulation, the processing server 116 may alter the trust scores assigned to the sub-child nodes (e.g., the sub-child nodes 708 and 710) located at a lower level in the graph structure 700. During alteration of the trust scores, the processing server 116 may be configured to increase the trust scores by a predetermined factor.

This representative scenario is being illustrated in graph structure 700. The processing server 116 may assign a trust score of 15 to the parent node 704 (based on any suitable techniques discussed previously). The child node 706 may inherit the trust score of 15 from the parent node 704. However, regarding the sub-child nodes 708 and 710, the processing server 116 may increase the trust scores of the sub-child nodes 708 and 710. In this example, the processing server 116 may assign the sub-child node 708 with a trust score equal to 20 and the sub-child node 710 may be assigned with a trust score equal to 25. It is to be noted that the illustrated trust scores are merely for the purpose of representation. In various non-limiting embodiments, an increase in the trust scores may be performed by any suitable predetermined factor.

It is contemplated that the alteration of trust scores of the sub-child nodes (e.g., the sub-child nodes 708 and 710) located at a lower level in the graph structure 700 may be performed to increase a distance of such sub-child nodes (e.g., the sub-child nodes 708 and 710) from the zero-vertex node (e.g., the zero-vertex node 702). It is to be noted that even though, the trust scores of the sub-child nodes (e.g., the sub-child nodes 708 and 710) may be increased by the processing server 116, it should not be referred to as the sub-child nodes (e.g., the sub-child nodes 708 and 710) are more trustworthy. Rather, in doing so, the processing server 116 may trivialize such sub-child nodes (e.g., the sub-child nodes 708 and 710) for malicious data assessment as these the web-resources associated with these sub-child nodes may be less likely to be visited (details will be discussed later in the disclosure).

Referring to FIG. 7, once all of the plurality of parent nodes (e.g., the parent nodes 404-1, 404-2 and 404-3), the plurality of child nodes (e.g., the child nodes 406-1, 406-2, 406-3, and 406-4), and the plurality of sub-child nodes (e.g., the sub-child nodes 408-1 and 408-2) have been assigned trust scores in accordance with any of the suitable techniques discussed above, the processing server may be configured to adjust lengths of the web-resource edges (e.g., the web-resource edges 412-1, 412-2, . . . 412-11) in accordance with the trust scores assigned to the plurality of parent nodes (e.g., the parent nodes 404-1, 404-2 and 404-3), the plurality of child nodes (e.g., the child nodes 406-1, 406-2, 406-3, and 406-4), and the plurality of sub-child nodes (e.g., the sub-child nodes 408-1 and 408-2).

In particular, a web-resource edge length of the web-resource edges connecting the given child node and the subset of the plurality of parent nodes is representative of the assigned trust score to the given child node. By way of an example, the web-resource edge length of the web-resource edges 412-2 and 412-4 connecting the given child node 406-2 and the parent nodes 404-1 and 404-2 may be a representative of the assigned trust score equal to 5 associated with the given child node 406-2, even though the parent nodes 404-1 and 404-2 may have different trust scores.

In a similar manner, a web-resource edge length of the web-resource edges connecting the given sub-child node with the subset of the plurality of parent nodes and the subset of the plurality of child nodes may be a representative of the assigned trust score to the given sub-child node. By way of an example, the web-resource edge length of the web-resource edges 412-10 and 412-11 connecting the given sub-child node 408-2 with the child node 406-2 and the child node 406-3 may be a representative of the assigned trust score equal to 5 associated with the sub-child node 408-2.

Step 306: Applying a Shortest-Path Algorithm

Figure 4:
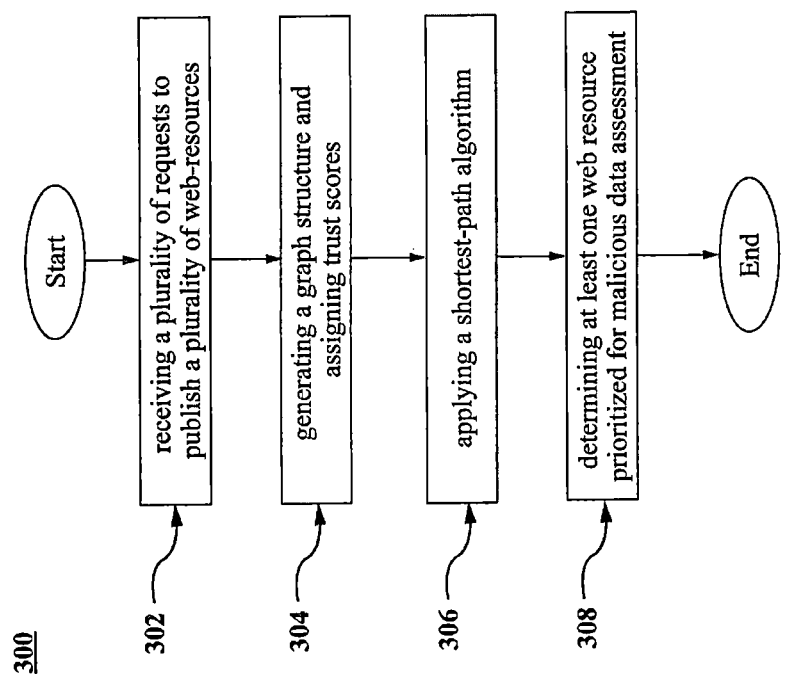
FIG. 4 is a schematic block diagram of a method assessing web-resources, in accordance with various non-limiting embodiments of the present technology.

Referring to FIG. 4, the method 300 proceeds to step 306, where the processing server 116, executes a shortest-path algorithm to the graph structure 400 for calculating a shortest-path of all respective paths from the zero-vertex node 402 to each child node (e.g., the child node 406-1), each one of the respective paths including the zero-vertex edge (e.g., the zero-vertex edge 410-1) and the given web-resource edge (e.g., the web-resource edge 412-1).

Figure 12:
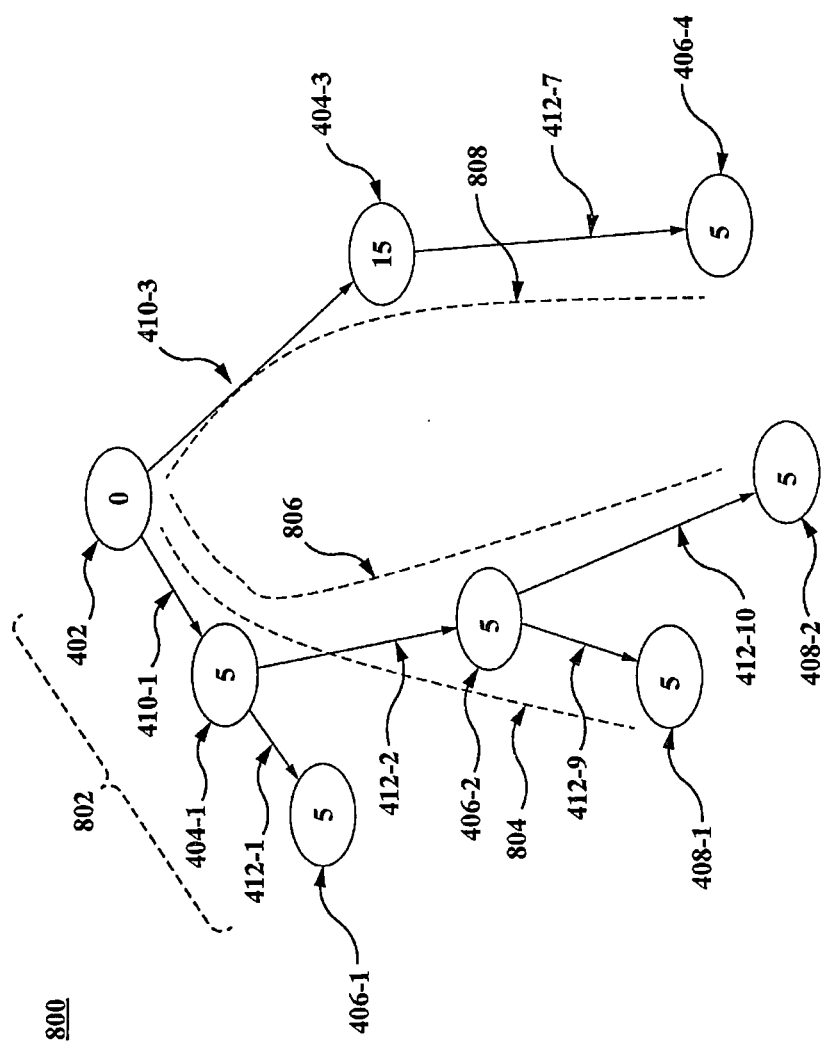
FIG. 12 depicts a shortest-path tree, generated by the processing server by using the graph structure as an input to a shortest-path algorithm, in accordance with various non-limiting embodiments of the present technology.

FIG. 12 depicts a representative shortest-path tree 800, generated by the processing server 116 by using the graph structure 400 as an input to the shortest-path algorithm, in accordance with various non-limiting embodiments of the present technology.

In certain non-limiting embodiments, the shortest-path algorithm may be based on the Dijkstra's Algorithm. The Dijkstra's Algorithm may fix the zero-vertex node (e.g., the zero-vertex node 402) as a source node and may be configured to find shortest-paths from the source node to all other nodes (e.g., the plurality of child nodes 406-1, 406-2, 406-3 and 406-4 and the plurality of sub-child nodes 408-1 and 408-2) in the graph structure 400, producing the shortest-path tree 800.

By way of an example, the shortest-path tree 800 may include a shortest-path 802 from the zero-vertex node 402 to the child node 406-1, a shortest-path 804 from the zero-vertex node 402 to the sub-child node 408-1, a shortest-path 806 from the zero-vertex node 402 to the sub-child node 408-2, and a shortest-path 808 from the zero-vertex node 402 to the child node 406-4.

Thus, the processing server 116 may apply the Dijkstra's Algorithm for calculating the shortest-path (e.g., the shortest-path 804) of all respective paths from the zero-vertex node (e.g., the zero-vertex node 402) to each sub-child node (e.g., the plurality of sub-child nodes 408-1 and 408-2), each one of the respective paths including the zero-vertex edge (e.g., the zero vertex edge 410-1) and the web-resource edges (e.g., the web-resource edges 412-1, 412-2, . . . 412-11) connecting the given parent node (e.g., the parent node 404-1), the given child node (e.g., the child node 406-2), and the given sub-child node (e.g., the sub-child node 408-2).

It is to be noted that the shortest-path tree 800 is merely an example without limiting the scope of the present technology and may include other shortest paths which have been omitted from FIG. 12 for the purpose of simplicity. Further, in various non-limiting embodiments, the processing server 116 may rely on any other suitable shortest-path algorithm, for example, Breadth-first search (BFS), Mikkel Thorup's algorithm for undirected single-source shortest paths with positive integer weights in linear time, Bellman-Ford algorithm or the like without departing from the techniques discussed in the present disclosure.

Step 308: Determining at Least One Web-Resource Prioritized for Malicious Data Assessment Referring to FIG. 4, the method 300 proceeds to step 308, where the processing server 116, based on the shortest-path, determines at least one web-resource, such that the at least one web-resource is prioritized for malicious data assessment.

In certain non-limiting embodiments, the shortest-paths 802, 804, 806, and 808 in their increasing order of the length (or at least having the same length) from the zero-vertex node 402 may be indicative of the first-to-check node for the malicious data assessment.

In certain non-limiting embodiments, the processing server 116 may analyze the shortest-path tree 800 toward the zero-vertex node 402. By way of an example, since the shortest-paths 802 is shortest among the shortest-paths 802, 804, 806, and 808, the child node 406-1 is closest to the zero-vertex node 402. The processing server 116 may determine the web-resource (e.g., the child web-resource 124-1) associated with the child node 406-1 and may prioritize the determined web-resource (e.g., the child web-resource 124-1) for malicious data assessment.

The processing server 116 may be configured to assess the determined web-resource (e.g., the child web-resource 124-1) for the inclusion of any malicious data. It to be contemplated that the processing server 116 may rely any suitable technique known in the art to perform the malicious data assessment without limiting scope of the present technology and without departing from the techniques discussed in the present disclosure.

In case the determined web-resource (e.g., the child web-resource 124-1) includes malicious data, the processing server 116 may be configured to notify the web server 114 about a presence of the malicious data associated with the determined web-resource (e.g., the child web-resource 124-1). In return, the web server 114 may deny the request from the user 108 to publish the requested content. In certain non-limiting embodiments, the web server 114 may reject the request from the user 108 to publish the content. While, in other non-limiting embodiments, the web server 114 may notify the user 108 via the client device 110 about the malicious data associated with the content and may provide with an option to modify/update the content to be published.

If, on the other hand, the determined web-resource (e.g., the child web-resource 124-1) is determined not to include malicious data, the processing server 116 then "moves up" toward the zero-vertex node 402 and analyzes the parent node 404-1.

Needless to say, it is contemplated that instead of analyzing the furthest away node, it is contemplated that the processing server 116 may traverse the shortest-path tree 800 away from the zero-vertex node 402. By way of an example, since the shortest-paths 802 is shortest among the shortest-paths 802, 804, 806, and 808, the parent node 404-1 is closest to the zero-vertex node 402. The processing server 116 may determine the web-resource (e.g., the parent web-resource 122-1) associated with the parent node 404-1 and may prioritize the determined web-resource (e.g., the parent web-resource 122-1) for malicious data assessment and "move down" afterwards.

In various non-limiting embodiments, if the processing server 116 is traversing the shortest-path tree 800 toward the zero-vertex node 402 and at least one of a child node or a sub-child node is identified to include the malicious data, the processing server 116 may skip assessing the associated parent nodes connected to the identified child node or the sub-child node. In a similar manner, if the processing server 116 is traversing the shortest-path tree 800 away from the zero-vertex node 402 and at least one of a parent node, a child node or a sub-child node is identified to include the malicious data, the processing server 116 may skip assessing the remaining nodes connected to the identified parent node, the child node or the sub-child node. It is also worthwhile to note that unlike the other existing techniques, the method 300 executed by the processing server 116 may not over burden the computational resources.

Thus, the processing server 116 may be configured to assess the parent web-resources, the child web-resources and the sub-child web-resources prioritized based on the shortest-path tree 800. Also, the processing server 116 may be configured to notify the web server 114 about the malicious data identified in one or more of: i) the at least one parent web-resource, ii) the at least one child web-resource, and iii) the at least one sub-child web-resource. In certain non-limiting embodiments, the degree of malicious data may be referred to an extent to which the malicious data may be harmful.

It is to be understood that the operations and functionality of the processing server 116, constituent components, and associated processes may be achieved by any one or more of hardware-based, software-based, and firmware-based elements. Such operational alternatives do not, in any way, limit the scope of the present technology.

Although the above explanation of the technology has been made from a perspective prior to the web-resources being published, it is not limited as such. It is contemplated that the above explained technology be implemented after the web-resources have been published.

It will also be understood that, although the embodiments presented herein have been described with reference to specific features and structures, it is clear that various modifications and combinations may be made without departing from such technologies. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present technology.

The invention claimed is:

1. A method for scheduling a plurality of web-resources for a malicious data assessment, the method executable by a processing server, the method comprising:
   receiving, by the processing server, a plurality of requests to publish the plurality of web-resources;
   generating, by the processing server, a graph structure comprising:
      a plurality of parent nodes associated with a plurality of parent web-resources,
         each of the plurality of parent nodes being assigned a respective trust score based on the association with the plurality of parent web-resources;
      a zero-vertex node being connected with the plurality of parent nodes via a plurality of zero-vertex edges such that,
         a zero-vertex edge length of each one of the plurality of zero-vertex edges representing the respective trust scores associated with the plurality of parent nodes;
      a plurality of child nodes associated with a plurality of child web-resources;
      a plurality of web-resource edges, a given web-resource edge of the plurality of web-resource edges connecting a given parent node of the plurality of parent nodes to a given child node of the plurality of child nodes such that,
         a given parent web-resource associated with the given parent node is linked to a given child web-resource associated with the given child node by virtue of a first hyperlink from the given parent web-resource to the given child web-resource;

using the graph structure, assigning, by the processing server, to the given child node of the plurality of child nodes a first assigned trust score based on a lowest trust score of a subset of the plurality of parent nodes connected to the given child node in the graph structure such that, a web-resource edge length of each one of the plurality of web-resource edges connecting the given child node and the subset of the plurality of parent nodes is a representative of the first assigned trust score;

applying, by the processing server, a shortest-path algorithm for calculating a shortest-path of all respective paths from the zero-vertex node to each child node, each one of the respective paths including a given zero-vertex edge and the given web-resource edge; and determining, by the processing server, based on the shortest-path, at least one web-resource of the plurality of web-resources such that, the at least one web-resource is prioritized for the malicious data assessment.

2. The method of claim 1, wherein the processing server is:

coupled to a search log comprising one or more search engine result pages generated in response to previously executed search queries and associated user interactions;

and wherein assigning the trust score to the given parent node comprises at least one of:

generating a ranking feature associated with the given parent web-resource associated with the given parent node, the ranking feature being indicative of an average ranking of the given parent web-resource within the one or more search engine result pages;

generating an interaction feature associated with the given parent web-resource associated with the given parent node, the interaction feature being indicative of user satisfaction with the given parent web-resource in response to interacting with the given parent web-resource within the one or more search engine result pages.

3. The method of claim 1, wherein the processing server has access to:

a first list comprising a first set of web-resources labelled as being non-malicious web-resources;

a second list comprising a second set of web-resources labelled as being malicious web-resources;

wherein the assigning the respective trust score to each of the plurality of parent nodes comprises:

assigning a first trust score to the given parent node if the given parent web-resource associated with the given parent node is included in the first list;

assigning a second trust score to the given parent node if the given parent web-resource associated with the given parent node is included in the second list;

assigning a third trust score to the given parent node if the given parent web-resource is not included within the first list or the second list.

4. The method of claim 3, wherein the method further comprises generating the first list and the second list based on searching, by the processing server, in a search log, wherein the search log is coupled to the processing server and comprises one or more searches previously executed and associated user activities.

5. The method of claim 3, wherein the first trust score is greater than the second trust score and the third trust score.

6. The method of claim 3, wherein the third trust score is greater than the second trust score.

7. The method of claim 1, wherein generating the graph structure further comprises:

generating, by the processing server, a plurality of sub-child nodes associated with a plurality of sub-child web-resources, such that, a given sub-child node of the plurality of sub-child nodes is connected to the given child node via an associated web-resource edge;

the given child web-resource associated with the given child node is linked to a given sub-child web-resource associated with the given sub-child node by virtue of a second hyperlink from the given child web-resource to the given sub-child web-resource;

using the graph structure, assigning, by the processing server, to the given sub-child node of the plurality of sub-child nodes a second assigned trust score based on an overall lowest trust score of: i) the subset of the plurality of parent nodes and ii) a subset of the plurality of child nodes connected to the given sub-child node in the graph structure such that, the web-resource edge length of each one of the plurality of web-resource edges connecting the given sub-child node with the subset of the plurality of parent nodes and the subset of the plurality of child nodes is a representative of the second assigned trust score;

applying, by the processing server, the shortest-path algorithm for calculating an overall shortest-path of all respective paths from the zero-vertex node to each sub-child node, each one of the respective paths including the given zero-vertex edge and the plurality of web-resource edges connecting the given parent node, the given child node, and the given sub-child node; and determining, by the processing server, based on the overall shortest-path, the at least one web-resource of the plurality of web-resources such that, the at least one web-resource is prioritized for the malicious data assessment.

8. The method of claim 7, wherein the plurality of web-resources comprises the plurality of parent web-resources, the plurality of child web-resources, and the plurality of sub-child web-resources.

9. The method of claim 7, wherein the method further comprises assessing, by the processing server, at least one of:

at least one parent web-resource which is prioritized for malicious data assessment;

at least one child web-resource which is prioritized for malicious data assessment;

at least one sub-child web-resource which is prioritized for malicious data assessment.

10. The method of claim 9, wherein the method further comprises notifying, by the processing server, about the malicious data identified in one or more of: i) the at least one child web-resource, ii) the at least one sub-child web-resource, and iii) the at least one parent web-resource.

11. The method of claim 7, wherein the method further comprises altering the second assigned trust score and the web-resource edge length of each one of the plurality of web-resource edges connecting the given sub-child node with the subset of the plurality of parent nodes and the subset of the plurality of child nodes.

12. The method of claim 11, wherein altering the second assigned trust score includes one or more of:

decreasing the second assigned trust score and the web-resource edge length of each one of the plurality of web-resource edges connecting the given sub-child node with the subset of the plurality of parent nodes and the subset of the plurality of child nodes is reduced accordingly;

increasing the second assigned trust score and the web-resource edge length of each one of the plurality of web-resource edges connecting the given sub-child node with the subset of the plurality of parent nodes and the subset of the plurality of child nodes is increased accordingly.

13. The method of claim 1, wherein the shortest-path algorithm corresponds to at least one of:
    i) Dijkstra's algorithm;
    ii) Breadth-first search (BFS);
    iii) Mikkel Thorup's algorithm for undirected single-source shortest paths with positive integer weights in linear time;
    iv) Bellman-Ford algorithm.

14. The method of claim 1, wherein the plurality of requests to publish the plurality of web-resources are received from a plurality of client devices.

15. The method of claim 14 further comprising rejecting a given request of the plurality of requests if the at least one web-resource of the plurality of web-resources associated the given request including malicious data.

16. A processing server for scheduling a plurality of web-resources for a malicious data assessment, the processing server is configured to:
    receive a plurality of requests to publish the plurality of web-resources;
    generate a graph structure, wherein the graph structure comprises:
        a plurality of parent nodes associated with a plurality of parent web-resources,
            each of the plurality of parent nodes being assigned a respective trust score based on the association with the plurality of parent web-resources;
        a zero-vertex node being connected with the plurality of parent nodes via a plurality of zero-vertex edges such that,
            a zero-vertex edge length of each one of the plurality of zero-vertex edges representing the respective trust scores associated with the plurality of parent nodes;
        a plurality of child nodes associated with a plurality of child web-resources;
        a plurality of web-resource edges, a given web-resource edge of the plurality of web-resource edges connecting a given parent node of the plurality of parent nodes to a given child node of the plurality of child nodes such that,
            a given parent web-resource associated with the given parent node is linked to a given child web-resource associated with the given child node by virtue of a first hyperlink from the given parent web-resource to the given child web-resource;
    assign, to the given child node of the plurality of child nodes, a first assigned trust score based on a lowest trust score of a subset of the plurality of parent nodes connected to the given child node in the graph structure such that,
        a web-resource edge length of each one of the plurality of web-resource edges connecting the given child node and the subset of the plurality of parent nodes is a representative of the first assigned trust score;
    apply a shortest-path algorithm for calculating a shortest-path of all respective paths from the zero-vertex node to each child node, each one of the respective paths including a given zero-vertex edge and the given web-resource edge; and
    determine, based on the shortest-path, at least one web-resource of the plurality of web-resources such that, the at least one web-resource is prioritized for the malicious data assessment.

17. The processing server of claim 16, wherein the processing server is:
    coupled to a search log comprising one or more search engine result pages generated in response to previously executed search queries and associated user interactions;
    and wherein the processing server is configured to assign the trust score to the given parent node by at least one of:
        generating a ranking feature associated with the given parent web-resource associated with the given parent node, the ranking feature being indicative of an average ranking of the given parent web-resource within the one or more search engine result pages;
        generating an interaction feature associated with the given parent web-resource associated with the given parent node, the interaction feature being indicative of user satisfaction with the given parent web-resource in response to interacting with the given parent web-resource within the one or more search engine result pages.

18. The processing server of claim 16, wherein the processing server has access to:
    a first list comprising a first set of web-resources labelled as being non-malicious web-resources;
    a second list comprising a second set of web-resources labelled as being malicious web-resources;
    and wherein the processing server is configured to assign the trust score to the given parent node by at least one of:
        assigning a first trust score to the given parent node if the given parent web-resource associated with the given parent node is included in the first list;
        assigning a second trust score to the given parent node if the given parent web-resource associated with the given parent node is included in the second list;
        assigning a third trust score to the given parent node if the given parent web-resource is not included within the first list or the second list.

19. The processing server of claim 16, wherein the processing server is further configured to:
    generate a plurality of sub-child nodes associated with a plurality of sub-child web-resources, such that,
        a given sub-child node of the plurality of sub-child nodes is connected to the given child node via an associated web-resource edge;
        the given child web-resource associated with the given child node is linked to a given sub-child web-resource associated with the given sub-child node by virtue of a second hyperlink from the given child web-resource to the given sub-child web-resource;
    assign, to the given sub-child node of the plurality of sub-child nodes a second assigned trust score based on an overall lowest trust score of: i) the subset of the plurality of parent nodes and ii) a subset of the plurality of child nodes connected to the given sub-child node in the graph structure such that, the web-resource edge length of each one of the plurality of web-resource edges connecting the given sub-child node with the subset of the plurality of parent nodes and the subset of the plurality of child nodes is a representative of the second assigned trust score;

apply the shortest-path algorithm for calculating an overall shortest-path of all respective paths from the zero-vertex node to each sub-child node, each one of the respective paths including the given zero-vertex edge and the plurality of web-resource edges connecting the given parent node, the given child node, and the given sub-child node; and determine, based on the overall shortest-path, the at least one web-resource of the plurality of web-resources such that, the at least one web-resource is prioritized for the malicious data assessment.

20. The processing server of claim 16, wherein the shortest-path algorithm corresponds to at least one of:
i) Dijkstra's algorithm;
ii) Breadth-first search (BFS);
iii) Mikkel Thorup's algorithm for undirected single-source shortest paths with positive integer weights in linear time;
iv) Bellman-Ford algorithm.

* * * * *